(12) United States Patent
Popper et al.

(10) Patent No.: US 9,065,283 B2
(45) Date of Patent: Jun. 23, 2015

(54) CHARGING SYSTEM

(75) Inventors: Richard S. Popper, Scottsdale, AZ (US); Jensen Jorgensen, Scottsdale, AZ (US)

(73) Assignee: XGlow P/T, LLC, Scottsdale, AZ (US)

( * ) Notice: Subject to any disclaimer, the term of this patent is extended or adjusted under 35 U.S.C. 154(b) by 377 days.

(21) Appl. No.: 13/599,451

(22) Filed: Aug. 30, 2012

(65) Prior Publication Data
US 2013/0063077 A1 Mar. 14, 2013

Related U.S. Application Data

(60) Provisional application No. 61/532,248, filed on Sep. 8, 2011.

(51) Int. Cl.
*H02J 7/00* (2006.01)
*H01M 2/10* (2006.01)
*F21L 13/00* (2006.01)
*F21L 4/00* (2006.01)
*F21S 13/02* (2006.01)
*F21S 13/12* (2006.01)

(52) U.S. Cl.
CPC ............. *H02J 7/0045* (2013.01); *F21S 13/12* (2013.01); *H01M 2/10* (2013.01); *F21L 13/00* (2013.01); *F21S 13/02* (2013.01); *F21L 4/00* (2013.01)

(58) Field of Classification Search
CPC .......... H02J 7/00; H02J 7/0045; H01M 2/10; F21L 13/00; F21L 4/00; F21S 13/02; F21S 13/12

USPC .......... 320/107, 113, 115; 362/183, 457, 458; 429/96, 97, 100
See application file for complete search history.

(56) References Cited

U.S. PATENT DOCUMENTS

| | | | | |
|---|---|---|---|---|
| 4,244,011 A | * | 1/1981 | Hammel et al. | 362/183 |
| 4,246,010 A | * | 1/1981 | Honacker | 96/45 |
| 4,357,648 A | * | 11/1982 | Nelson | 362/183 |
| 5,590,028 A | * | 12/1996 | Duncan | 361/737 |
| 6,161,938 A | * | 12/2000 | Kish et al. | 362/183 |
| 6,179,431 B1 | * | 1/2001 | Chien | 362/84 |
| RE37,092 E | * | 3/2001 | Sharrah et al. | 362/183 |
| 2001/0031391 A1 | * | 10/2001 | Hironaka et al. | 429/94 |
| 2002/0056621 A1 | * | 5/2002 | Nakai | 200/61.39 |
| 2002/0114994 A1 | * | 8/2002 | Yabuki et al. | 429/178 |
| 2007/0164703 A1 | * | 7/2007 | Noguchi et al. | 320/107 |
| 2008/0057393 A1 | * | 3/2008 | Onuki et al. | 429/159 |
| 2008/0284375 A1 | * | 11/2008 | Nagaoka et al. | 320/116 |
| 2010/0143772 A1 | * | 6/2010 | Byun et al. | 429/82 |
| 2011/0045333 A1 | * | 2/2011 | Kim et al. | 429/120 |
| 2011/0084220 A1 | * | 4/2011 | Koning et al. | 250/492.3 |
| 2011/0294001 A1 | * | 12/2011 | Byun et al. | 429/181 |

\* cited by examiner

*Primary Examiner* — Phallaka Kik
(74) *Attorney, Agent, or Firm* — Stephen C. Beuerle; Procopio Cory Hargreaves & Savitch LLP (57) ABSTRACT

A charging system includes a charging cap having a cradle with first and second electrodes; and a rechargeable unit including a charging end having third and fourth electrodes arranged for engagement by the first and second electrode of the charging cap when the rechargeable unit is received in the charging cap and thereby provide electrical contact to enable charging of the rechargeable unit. At least one recess in the rechargeable unit is arranged to receive one or more clamping members of the charging cap for releasably securing the rechargeable unit to the charging cap.

18 Claims, 6 Drawing Sheets

CHARGING SYSTEM

CROSS-REFERENCE TO RELATED APPLICATION

This application claims priority to U.S. Provisional Patent Application No. 61/532,248 filed Sep. 8, 2011, which is incorporated by reference herein as though set forth in full.

FIELD OF THE INVENTION

The present invention relates to charging systems including a charging station, a charging cap, and a rechargeable unit.

BACKGROUND OF THE INVENTION

Rechargeable units are becoming more and more popular as the battery quality is increasing. A number of different charging systems are known, but they generally all require that the battery is dismounted from the unit, that the unit is changed directly through a male and female plug and socket system or that the unit is placed in a cradle during charging with the result that the unit cannot be used for extended periods at a time. Thus, there is a need for a charging system which provides a rechargeable unit which is truly useable during charging.

From U.S. Pat. No. 5,459,389 a dual charging system is known. The system comprises a battery pack and a charger unit, which may be recharged by either plugging directly into a power main or by placement in the charger unit. The charging unit is a flat structure with a slight depression for receiving the battery pack which requires that the charging unit is equipped with hooks to keep the battery pack properly positioned in the charger unit. These hooks however, make the positioning of the battery pack in the charger unit more complicated as a specific insertion angle and twisting movement required to position the battery pack. Also, the movement needed to remove the battery pack from the charger unit is complex, which makes the action slow in order not to risk damaging the hooks. Furthermore, the insertion of the battery pack into the mains requires that a set of prongs are extended from the battery pack housing, which requires that the positioning of the battery pack is performed rather slowly in order to be sure that the prongs are extended the correct amount or else there is a risk that the battery pack will not be recharged. Additionally the retractable prongs make the battery unit complex and thus more prone to failure.

US 2007/0090789 describes a mobile device with dual charging ports. The device can be charged by a plug or by insertion in a charging seat. When recharged by the charging seat, the device specifically needs to be inserted along a predetermined direction in order-to engage with the conductive terminals of the charging seat. Further there is an eminent risk that the conductive terminals will be damaged due to their design and placement perpendicular to a possible direction of insertion. Also, once the device is inserted it is not possible to see if the device is properly inserted to achieve electrical contact with the conductive terminals.

Thus there is also a need for a system allowing reliable charging of a rechargeable unit under a variety of conditions. The unit must be easy to use and be sturdy and reliably even when used with swift movements.

SUMMARY OF THE INVENTION

Dual Charging System

In a first aspect the present invention provides a charging system which ensures that a rechargeable unit can be charged under various conditions.

In a second aspect the present invention provides a charging system enabling swift insertion and removal of a rechargeable unit using only one hand.

In a third aspect the present invention provides a charging system which ensures a minimum risk of mis-alignment of the electrodes of the charging station and the rechargeable unit.

The above aspects together with other advantages are provided in that the dual charging system comprises a rechargeable unit and a charging station wherein the charging station comprises retaining means and a base part, said base part having a charging seat with a projecting peg acting as a first electrode, around which an at least partly circumferential second electrode is arranged, and the rechargeable unit comprises a notch, acting as a third electrode, and a fourth electrode, each arranged on the rechargeable unit to engage with the first and second electrode respectively of the charging seat when the rechargeable element is retained in the charging station.

When the rechargeable unit is arranged in the charging station, electrical contact is achieved between the first and third electrode and the second and fourth electrode respectively. The electrical contact between the electrodes allows an energy storage means, such as a rechargeable battery, in the rechargeable unit to be charged.

In the present application the phrase "correct position" is used of the positions of the rechargeable unit in the charging station in which the first and third, and second and fourth electrode engage allowing the rechargeable unit to be charged if desired.

A dual charging system according to the present invention as described above, provides a safe charging function and arrangement, which allows easy use and minimizes the risk of achieving a wrong position of the rechargeable unit in the charging station.

When the first electrode is a peg projecting from a charging seat as in the present invention, it helps position the rechargeable unit. When the third electrode of the rechargeable unit is a notch, the third electrode may catch the first electrode during the movement when the rechargeable unit is inserted in the charging station, and thus enhance the chance of correct positioning even further.

Preferably the notch is an at least partly conical structure in which the slanting edges help catch the first electrode and guide the first electrode to slide along the slanting edge to a correct position, in which electrical contact between the first and third electrode is achieved and maintained until the rechargeable unit is removed from the charging station or otherwise intentionally disengaged. The actual electrically conducting part of the third electrode may be arranged in the apex of the conical notch.

When an at least partly circumferential second electrode is arranged around the first electrode more than one correct position of the rechargeable unit in the charging station is achieved. Having more than one correct position of the rechargeable unit in the charging station makes positioning of the rechargeable unit easier and thus possibly faster and with less risk of mis-alignment of the electrodes of the charging station and rechargeable unit with respect to each other.

Preferably the rechargeable unit is at least substantially cylindrical or has a similar shape with a high degree of symmetry in order to fit into the charging station in a number of different orientations. Other possible cross sections of the rechargeable unit than circular (as is the case for the cylindrical shape) are decagon, nonagon or hexagon or similar.

When the charging station comprises retaining means the rechargeable unit is kept in place in the charging station until intentionally removed. The retaining means ensures that electrical contact between the electrodes of the rechargeable unit and charging station is maintained. This means that the rechargeable unit can be charged by the charging station not only indoors but even if the charging station is not placed on a solid or steady surface for example if the charging station is arranged in a van, boat, etc., which provides irregular and even rough movement of the charging station and rechargeable unit. Preferably the retaining means is arranged to allow removal and insertion of the rechargeable unit in a simple movement which does not require a much defined direction of insertion or removal and/or the retaining means may help guide the rechargeable unit to a correct position.

The retaining means also helps prevent that the rechargeable unit is accidentally knocked out of the recharging station, and thus ensures that the rechargeable unit can be charged reliably by the charging station even in an area or in a place with a lot of activity as for example a workshop.

Furthermore, the charging station provides a secure and easy to find storage place for the rechargeable unit even when the rechargeable unit is not being charged.

The charging station according to the present invention may also comprise stabilizing means such a weight position in the base part to increase the weight and lower the center of mass of the charging station in order to enhance the stability and thereby prevent the charging station with or without the rechargeable unit to be tilted or completely knocked over.

The charging station may be arranged to hang on a wall or stand on a surface.

All in all, a dual charging system according to the present invention enables release of the rechargeable unit from the charging station and correct positioning of the rechargeable unit in the charging station, in a simple and effortless movement which may even be possible with one hand and without the full attention of a user. Release and removal of the rechargeable unit from the charging station is made possible and easy even under unfavorable conditions such as darkness or if the charging station is positioned in, for example, but not by way of limitation, a hard to reach place, a moving vehicle or similar.

Preferably the rechargeable unit further comprises a socket for receiving a second charging means as this will make the charging system effective in even more situations. For example if charged by a plug with a cable a user is able to use the rechargeable unit while it is being charged. In some situations it may be handy to be able to charge the rechargeable unit without a charging station. Such situations can be during travel to avoid extra luggage or if the rechargeable unit is charged in an area where a charging station cannot advantageously be installed.

The socket may be arranged to receive a one legged plug, or, for example, but not by way of limitation, a USB or mini USB plug. The socket may also be configured to receive a specially designed plug in order for the rechargeable unit to be charged by a specially designed item only to avoid destruction of the rechargeable unit.

The rechargeable unit can further comprise a seal or plug to engage with or over the socket for receiving the second charging means when the socket is not in use. Such a seal or plug prevents that moisture or dust enters the socket, allowing safe use of the rechargeable unit even in, for example, but not by way of limitation, rain, fog or snow without the risk of malfunction and damages to the rechargeable unit.

Preferably both of the charging station and the rechargeable unit contain one or more electrical circuits.

Preferably the rechargeable unit comprises a single circuit board which relates to both charging options, i.e. charging by charging station and by plug.

An advantageous arrangement of the charging station is achieved if the first electrode is arranged as a center point around which the second electrode is arranged as a circular element or at least one circle section element. If the first electrode is positioned in a central position in the charging seat there may be a number of optimal "curves" of insertion as the central position allows a high degree of symmetry and hereby enhance the chalice of correct positioning of the rechargeable unit in the changing station. The positioning is made even easier if the second electrode is arranged around the first electrode as one or more circle sections as the number of correct positions of the rechargeable unit in the charging station is further increased. The number of correct positions is maximized if the second electrode is a circular element arranged around the first electrode due to the up to 360° symmetry of the arrangement.

In general, arrangements of the charging station where the second electrode is rotational symmetric around an axis defined by the first electrode perpendicular to the charging seat can be advantageous due to the fact that the rechargeable unit will be positioned correctly in a number of different orientations and no single correct position exists. Having more than one correct position greatly decreases the risk of mis-alignment of the first and third, and especially the second and fourth electrode with respect to each other. Rotational symmetry can be achieved by one or more circle sections but also from other more irregular shapes or, for example, but not by way of limitation, by a hexagonal shape or a number of chevrons arranged "shoulder to shoulder" or apart together forming the circumferential second electrode.

A preferred embodiment of the present invention is achieved if the second electrode is magnetic and the fourth electrode is magnetic or magnetizable, or vice versa as this may help correct positioning of the rechargeable unit in the charging station. If, for example the second electrode is arranged as a circle section covering a certain angular area around the first electrode and said second electrode is magnetic, it may by magnetic interaction pull a magnetic or magnetizable fourth electrode to a correct position where there is electric contact between the first and third and second and fourth electrode respectively. It is also possible that the second electrode is magnetizable and the fourth electrode is magnetic.

In yet another preferred embodiment the retaining means is arms or a C- or U-shaped elastic element which allows the rechargeable unit to be pushed in and pulled out through the opening between the arms or in the C- or U-structure. The elasticity can be achieved by the design of the arms of the C- or U-shaped structure, which for example may be thin enough to be flexible or made from a rubber or plastic material which provides elasticity even if the structure of the arms, C- or U-shape is quite heavy and/or sturdy. When the rechargeable unit may be inserted not only from the top as will be the case if the retaining means are O shaped but also through for example the front of the charging station through the opening between the arms or in the C- or U-shaped structure the rechargeable unit may be inserted and released fast and precise without the risk of damaging either the electrodes, the retaining means or any other part of the charging station. The opening between the arms or in the C- or U-shaped structure of the retaining means may help guide the rechargeable unit to a correct position.

The retaining means may also be another structure through which the rechargeable unit may be inserted.

The rechargeable unit may be inserted through an opening in the retaining means, preferably with the application of a force as, for example, but not by way of limitation, a slight push. The retaining means may be arranged in order for them to help keep the rechargeable unit in place in the charging station during a number of different conditions, for example, but not by way of limitation, even if the charging station is pushed over, or shaken heavily.

If the retaining means is arranged to hug the rechargeable unit positioned in the charging station, it is prevented that the rechargeable unit is partly or completely knocked out of its intended position in the charging station during charging.

The retaining means may also be one or more magnetic elements preferably arranged at least as or as part of the second electrode, but can also be arranged in all of or part of the base of the charging station, in at least a part of a possible wall part of the charging station or even in retaining means such as the C or U shaped structure described above. The surface of a magnetic element may be free or the magnetic element may be embedded in the structure of the charging station. As described above, if the second electrode is magnetic it may not only act as a retaining means, but may also help correct positioning of the rechargeable unit in the charging station by pulling the fourth electrode towards itself by magnetic interaction.

In a preferred embodiment the rechargeable unit is arranged in a flashlight, preferably in the end opposing a light emitting part. The rechargeable unit may be releasable from the flashlight, which, for example, but not by way of limitation, enables the use of rechargeable unit with different flashlights or to have a number of rechargeable units for a single flashlight. Preferably the rechargeable unit is an integrated part of the flashlight, in which case the flashlight itself may be regarded as the rechargeable unit. When the rechargeable unit is integrated in a flashlight it makes the structure of the flashlight/rechargeable unit sturdy without the risk of the rechargeable unit being unintentionally released from the flashlight during even rough or heavy use or transport.

The rechargeable unit may also be arranged in other devices such as, for example, but not by way of limitation, power tools or toys in which case the same arguments as presented for the flashlight apply with respect to the releasable and integrated configurations respectively.

Preferably the flashlight contains at least one LED as a light source as LEDs can provide high light intensity and long life for both a power source, which in the present case is a rechargeable unit, and light source.

The charging station and the rechargeable unit are not only useful together but also on their own. The descriptions and many advantages of both the charging station and the rechargeable unit given above are valid for the rechargeable unit and charging station alone or together.

Another aspect of the invention involves a charging system comprising a charging cap including a base and a circumferential wall which together forms a cradle, the cradle including a bottom surface and an inner wall having a lower wall part abutting the perimeter of the bottom surface, a peg acting as a first electrode extends from the bottom surface and at least one protrusion acting as a second electrode protrudes from the lower part on the inner wall, said inner wall also comprises one or more clamping members; and a rechargeable unit including a first charging end and an opposing second end, said first charging end having an end surface in which a third electrode is arranged, the first charging end further including a fourth electrode in form of a collar arranged around the end surface, the rechargeable unit further including at least one recess arranged to receive the one or more clamping members of the charging cap for releasably securing the rechargeable unit to the charging cap, the third and fourth electrode of the rechargeable unit arranged for engagement by the first and second electrode of the charging cap when the rechargeable unit is received in the charging cap and thereby provide electrical contact to enable charging of the rechargeable unit.

One or more implementations of the aspect of the invention described immediately above includes one or more of the following: the third electrode is a button for turning on and off the rechargeable unit; the first electrode is spring loaded against the third electrode when the rechargeable unit is received in the charging cap; the second electrode is spring loaded against the fourth electrode when the rechargeable unit is received in the charging cap; at least one of the cradle and the charging end is rotational symmetric; the collar is a striking bezel; the circumferential wall of the charging cap includes an outer side, an inner side, and at least one opening, and the one or more clamping members extend from the outer side of the wall through the at least one opening in the wall and away from the inner side of the wall; and/or the rechargeable unit is a flashlight, and the flashlight is usable in all orientations of the flashlight when the rechargeable unit is secured to the charging cap by the one or more clamping members.

Another aspect of the invention involves a rechargeable unit for use with a charging cap including one or more clamping members for releasably securing the charging cap to the rechargeable unit. The rechargeable unit includes charging end and an opposing end, said charging end having an end surface in which an end surface electrode is arranged and a collar arranged around the end surface forming a collar electrode, the rechargeable unit including at least one recess arranged to receive the one or more clamping members of the charging cap for releasably securing the charging cap to the rechargeable unit.

One or more implementations of the aspect of the invention described immediately above includes one or more of the following: the end surface include a charging socket configured to receive a charging plug for direct charging of the rechargeable unit; the end surface include a pair of charging sockets, each configured to receive a charging plug for direct charging of the rechargeable unit; the rechargeable unit includes a side with a charging socket configured to receive a charging plug for direct charging of the rechargeable unit; the collar is a striking bezel; the end surface electrode is a button for turning on and off the rechargeable unit; and/or the rechargeable unit is a flashlight, and the flashlight is usable in all orientations of the flashlight when the rechargeable unit is secured to the charging cap by the one or more clamping members.

A still further aspect of the invention involves a charging cap for use with a rechargeable unit. The charging cap includes a base and a circumferential wall which together forms a cradle for receiving the rechargeable unit, the cradle including a bottom surface and an inner wall having a lower wall part abutting the perimeter of the bottom surface, from said bottom surface a peg acting as a first electrode extends and a ledge acting as a second electrode protrudes from the lower wall part of the inner wall, said wall also including one or more clamping members for releasably securing the charging cap to the rechargeable unit.

One or more implementations of the aspect of the invention described immediately above includes one or more of the following: the circumferential wall of the charging cap includes an outer side, an inner side, and at least one opening, and the one or more clamping members extend from the outer side of the wall through the at least one opening in the wall and away from the inner side of the wall; and/or the rechargeable unit is a flashlight, and the flashlight is usable in all orientations of the flashlight when the rechargeable unit is secured to the charging cap by the one or more clamping members.

Consistent with the foregoing summary of preferred embodiments, and the ensuing detailed description, which are to be taken together, the invention also contemplates associated apparatus and method embodiments.

Charging System with Charging Cap and Rechargeable Unit

In one aspect of the present invention there is provided a charging system which provides a stable and secure connection between a charging cap and a rechargeable unit even in demanding situations.

In another aspect of the present invention there is provided a charging system which enables the use of the rechargeable unit while charging.

In yet another aspect of the present invention there is provided a charging system which may protect the electrodes from rain, dust, and other environmental influences during charging.

In still another aspect of the present invention there is provided a charging mechanism that allows a rechargeable unit to be fully fluid and particle proof during use.

These and other advantages are achieved by a charging system comprising a charging cap and a rechargeable unit, wherein the charging cap comprises a base and a circumferential wall which together forms a cradle for receiving said rechargeable unit, the cradle comprises a bottom surface and an inner wall having a lower wall part abutting the perimeter of the bottom surface, a peg acting as a first electrode extends from the bottom surface and at least one protrusion acting as a second electrode protrudes from the lower part on the inner wall, said inner wall also comprises one or more clamping members for releasably securing the charging cap to the rechargeable unit, the rechargeable unit comprises a first charging end opposing a second end, said first charging end having an end surface in which a third electrode is arranged, the first charging end further comprises a fourth electrode in the form of a collar arranged around the end surface, the rechargeable unit further comprises at least one recess arranged to receive the clamping members of the charging cap, and the first and second electrode of the charging cap are arranged to engage with respectively the third and fourth electrode of the rechargeable unit when the rechargeable unit is received in the charging cap and thereby provide electrical contact to enable charging of the rechargeable unit. When the charging system this way consists of a cap which fits over the end of a rechargeable unit a compact charging system is achieved. This means that even when engaged in the charging cap the rechargeable unit can still be handy, as the charging cap can be arranged to add only a little extra volume to the rechargeable unit.

The at least one protrusion is preferably in the form of a ledge extending along one or more parts of the inner wall parallel with the plane of the bottom surface. The protrusion may also extend for the full length of the wall parallel to the bottom surface.

The clamping members of the charging cap, which engages in the at least one recess of the rechargeable unit, ensures that the charging cap stays in place over the first charging end of the rechargeable unit and hereby provides a very high degree of reliability to the charging system. As a result of this, the rechargeable unit of the present invention may be used during charging as the rechargeable cap is securely fastened to the first charging end of the rechargeable unit and thus even when pulled, dropped or otherwise handled contact between the electrodes is maintained.

The charging cap is arranged with means for connecting to a power source. Preferably, the charging cap has a female socket for receiving a plug and cable from a converter. The cable which is connected by the female socket may be of any length which fits any given conditions hereby allowing the rechargeable unit to be used in an area defined by the cable length during charging. This area can be in, for example, but not by way of limitation, a car, a boat, a workshop, or a campsite with a generator.

When the rechargeable unit needs to be recharged the rechargeable cap is pushed over the rechargeable unit until the clamping members clicks or otherwise locks themselves into the at least one recess of the rechargeable unit. This way the one or more clamping members ensures that the charging cap stays in place and is not pushed or pulled away from the correct charging position by accident. When the rechargeable cap is to be removed, the clamping members are pressed, pushed, or otherwise made to retract or be removed from the at least one recess allowing effortless removal of the rechargeable unit from the charging cap.

Further when the charging part (the charging cap) as in the preferred embodiments have the shape of a cap i.e. a part that extends preferably quite narrow over the first charging end of the rechargeable unit, the electrodes are protected and are less exposed to dust, moisture in the air or even to physical impacts. This protection of the vital parts such as the electrodes can be a great advantage if the rechargeable unit is intended for heavy use for example on a boat where salt water sprays may occur or where there is a risk that the rechargeable unit arranged in the charging cap may be knocked down from its resting position during charging or receive impacts while in use inserted in the charging cap.

It is also possible that a seal element is arranged on either the outer side of the rechargeable unit and/or at the inner side of the cradle of the charging cap. A seal element may provide even more efficient protection of the electrodes of the system when the rechargeable unit is engaged in the charging cap, as it may even more efficiently prevent the intrusion of moisture, dust, etc.

A charging indicator can advantageously be arranged on the charging cap. Said charging indicator may visually indicate if the system is charging. An indicator may also indicate the charging level of the rechargeable unit.

Preferably the one or more clamping members extends from an outer side of the wall through at least one opening and further away from the inner wall and this way may be arranged to engage the at least one recess of the rechargeable unit when the rechargeable unit is inserted in the cradle of the charging cap. The rechargeable unit may be released again from the cradle, for example, but not by way of limitation, by pushing, pressing, sliding, or twisting the part of the clamping member present on the outer side of the wall.

Preferably the one or more clamping member is arranged so that it can be pushed, pressed, twisted, etc. to disengage from the recess of the rechargeable unit, by use of one hand only.

Preferably, the charging cap is light weight to make the use of the rechargeable unit engaged in the charging cap even easier to handle.

In preferred embodiments the charging cap has a simple outer surface, with few or no protrusions to ensure that the rechargeable unit arranged in the charging cap can be as useful as possible in many situations. When there is few or no protruding parts there is less risk of parts of the system getting caught in wires, clothes, etc. Also, the simple surface may ensure that the charging cap is arranged to allow unrestricted handling of the rechargeable unit when engaged in the charging cap.

Ideally the third electrode is a button for turning on and off the rechargeable unit as this reduces the number of elements on the outer side of the rechargeable unit.

Preferably the first electrode is a spring loaded against the third electrode when the rechargeable unit is received in the charging cap and/or the second electrode is spring loaded against the fourth electrode when the rechargeable unit is received in the charging cap. Spring loading of the first and/or second electrode against the rechargeable unit i.e. against the third and fourth electrodes respectively, further ensures that the first and third and second and fourth electrode are in contact at all times during the charging of the rechargeable unit.

Also spring loading of the first and/or second electrode may help push the rechargeable unit out of its engaged position when the one or more clamping members are released from the recess.

It is an advantage if the cradle and/or the first charging end is rotationally symmetric as this enhances the number of correct positions of the rechargeable unit in the charging cap. If for example the peg (first electrode) is a cylinder positioned in the middle of the bottom surface of the cradle and the ledge (second electrode) is arranged to form a full circle along the inner wall there is no preferred position of the rechargeable unit in the charging cap.

In preferred embodiments of the charging system the rechargeable unit is a flashlight. Flashlights which are used often will require frequent exchange of batteries if conventional batteries are used and thus a rechargeable flashlight is a great advantage. A flashlight arranged with the present charging system will have the advantage that the flashlight can be used during charging due to the charging cap which locks securely to the rechargeable unit/flashlight. If for example the flashlight is used on a boat, it can be arranged in the charging cap the most of the time while still being used, for example, but not by way of limitation, in the machine room. When attached to the charging cap the flashlight may always be easy to find and can at most times be fully charged. If the flashlight is to be used in another area of the boat the flashlight is disconnected from the charging cap and can be used as a standard flashlight.

In advantageous embodiments the collar i.e. the fourth electrode is a striking bezel, as a striking bezel is a useful addition to a flashlight for, for example, but not by way of limitation, using the flashlight to break through glass. A striking bezel may also be arranged to protect the third electrode arranged at the end surface of the first charging end of the rechargeable unit.

Preferably the fourth electrode i.e. the collar extends away from the end surface in order to provide protection to electrodes, buttons etc. present on the end surface. However it may also be arranged that the fourth electrode is leveled with the end surface.

In preferred embodiments the flashlight or other rechargeable unit is waterproof.

The charging cap and/or the rechargeable unit may comprise different components such as one or more of rechargeable energy source such as a battery, wiring, circuit boards, lights source, lens, charging indicators etc.

The charging cap and the rechargeable unit as described above are separate items i.e. the present invention also relates to a charging cap as described above and to a rechargeable unit also as described above.

The present invention provides a truly multi-functional charging system and combine the use of a charging cap and the use of a direct plug system in a new, better and convenient way. Further the present invention provides highly reliable charging system which can function even under demanding circumstances with heavy use and/or rough environment (rain, mud, dust, salt water etc.). This means that the present invention may be useful even for use by for example the military or police, which at all times must be able to rely on the quality, stability and functionality of their equipment.

BRIEF DESCRIPTION OF THE DRAWINGS

Referring to the drawings.

DETAILED DESCRIPTION OF THE INVENTION

Dual Charging System

Figure 1:
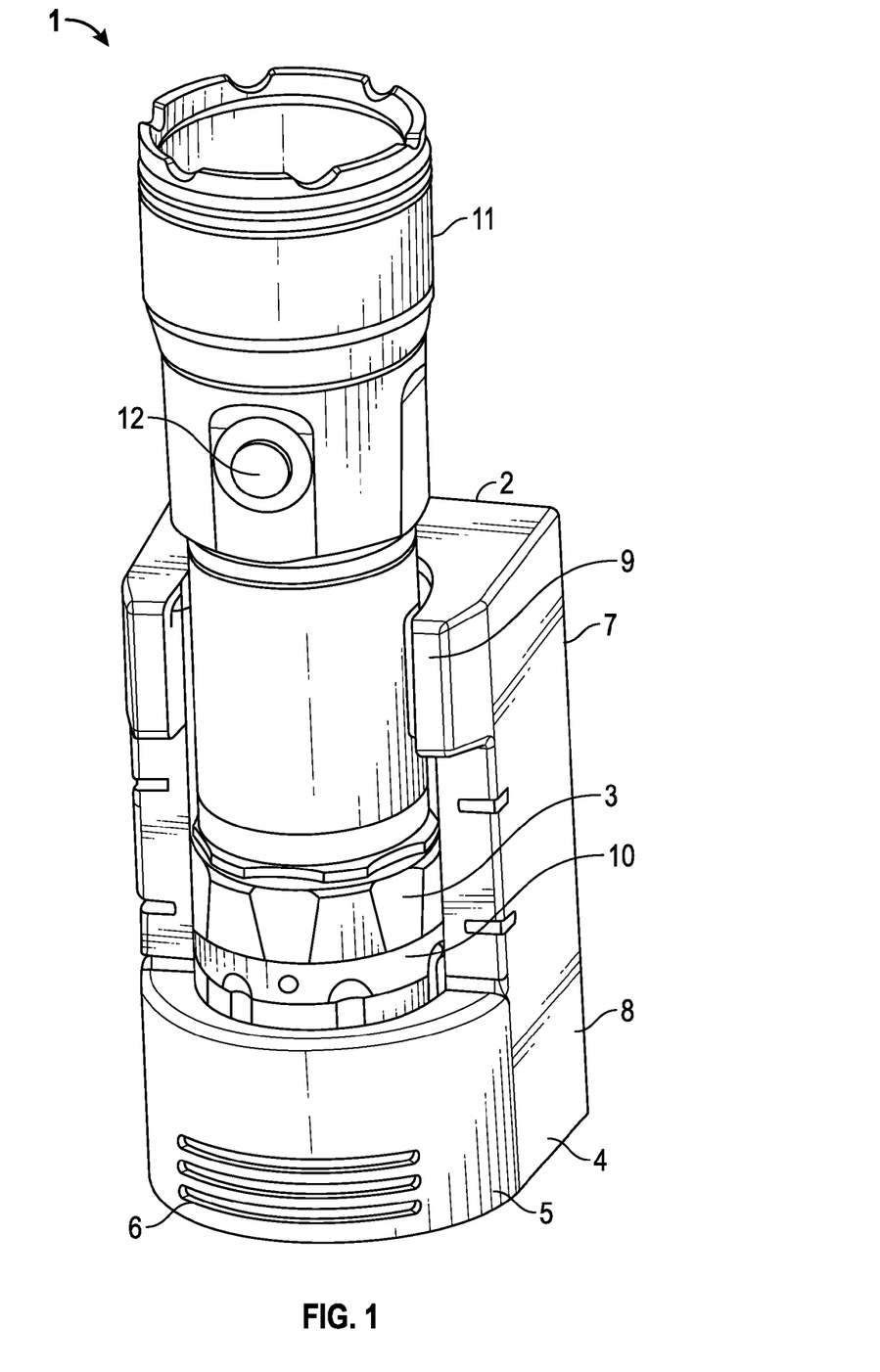
FIG. 1 shows a dual charging system according to the present invention in which the rechargeable unit is an integral part of a flashlight.

FIG. 1 shows a dual charging system 1 according to the present invention. The system 1 has two main parts, a charging station 2 and a rechargeable unit 3, in the present example in the form of a flashlight. The charging station 2 has a base part 4 with a rounded front 5 having a number of optional grooves 6. The charging station 2 further contains an upright part 7 extending from a rear part 8 of the base part 4. The upright part 7 is provided with retaining means in form of two arms 9 arranged to slightly hug the rechargeable unit 3 when arranged in the charging station 2 in order to keep the rechargeable unit 3 correctly positioned in the charging station 2. The rechargeable unit 3 comprises a first end 10 engaging in the charging station 3 and a second end 11 opposing said first end 10. The second end in the present example contains a LED light source (not shown). The rechargeable unit 3 also comprises a switch 12 for turning the flashlight on and off.

Figure 2:
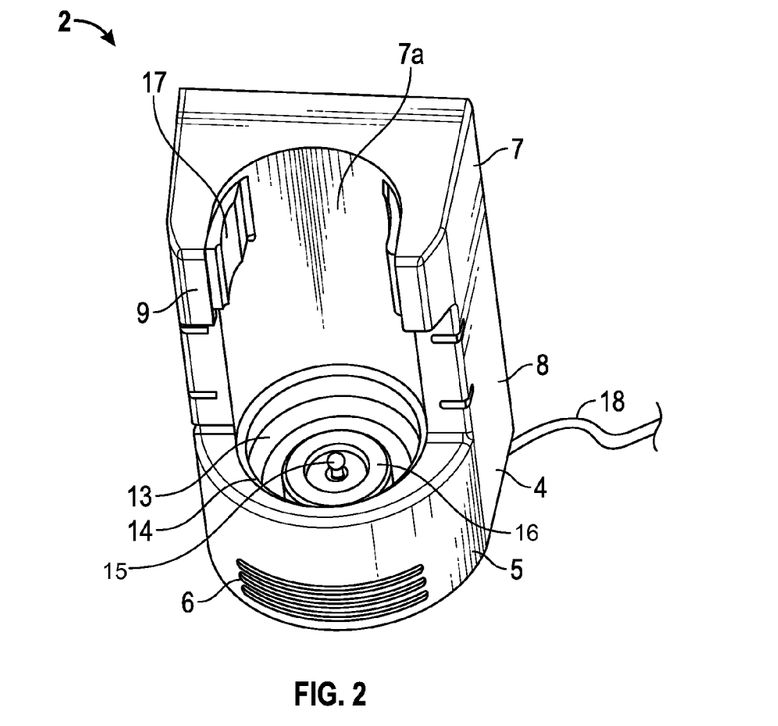
FIG. 2 shows a charging station according to the present invention seen in a perspective view from above.

FIG. 2 shows the charging station from FIG. 1 seen in perspective from above. For like parts same numerals are used. A charging seat 13 is depressed in the base part 4 of the charging station 2. The charging seat 13 is circular with a substantially flat bottom 14. Placed centrally in the charging seat 13 is a first electrode 15 which in the present example is a cylindrical peg with a ball shaped head. Concentric around the first electrode 15 is a circular second electrode 16, which in the present example is slightly raised from the bottom 14 of the charging seat 13, but may as well be leveled with the bottom 14. The two arms 9 arranged to retain a rechargeable unit in the charging station 2 are each provided with an inner element 17 to help grasp the rechargeable unit 3. Together the arms 9 form a U shape and with the inner elements 17 a slight C shape. The inner elements 17 may be omitted if the arms 9, or similar retaining means, alone are capable of retaining the rechargeable unit 3 in the charging station 2.

In the present example an inner wall 7*a* of the upright part 7 is rounded to fit the curvature of the belonging rechargeable unit (not shown). Together the charging seat 13, inner wall 7*a* and the arms 9 form a cavity for receiving the rechargeable unit (not shown).

The charging station also comprises a cable 18 for providing electrical connection to the charging station 2.

Figure 3:
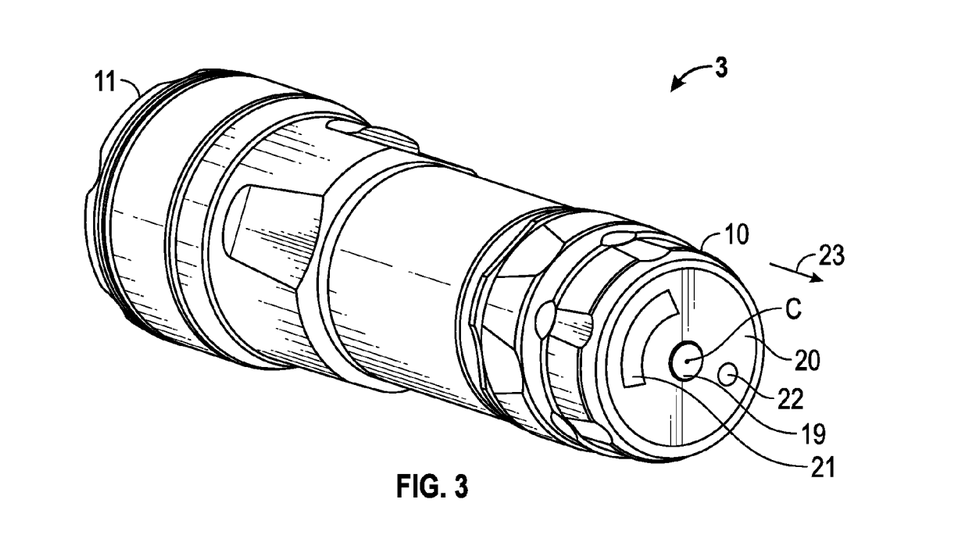
FIG. 3 shows a rechargeable unit integrated in a flashlight seen in perspective from the end containing the third and fourth electrode.

FIG. 3 shows the rechargeable unit 3 seen in perspective from the first end 10. A center third electrode 19 is arranged in an at least substantially flat surface 20 of the first end 10 of the flashlight rechargeable unit 3. The surface 20 is arranged to abut the charging seat 13 of the charging station 2. The third electrode 19 of the present example is a conical notch with the apex in the center C of the surface 20. The surface 20 also comprises a fourth electrode 21 which in this exemplary embodiment is a circle section spanning approximately 90°. In the surface 20 is also arranged a socket 22 for receiving a second charging means 23.

Figure 4A:
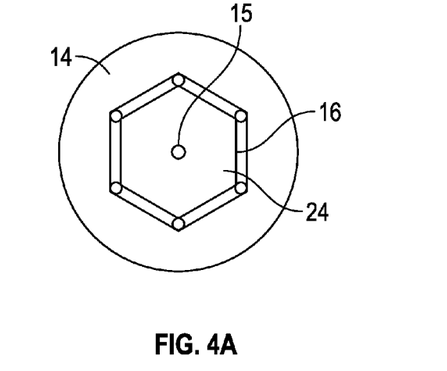
FIGS. 4a and 4b shows exemplary configurations of the first and second electrodes in a charging seat.
Figure 4B:
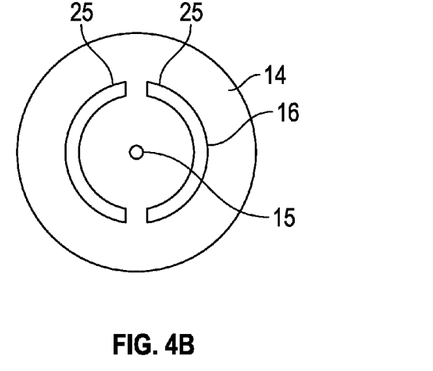

FIGS. 4*a* and 4*b* show two different exemplary configurations of the first and second electrode of a charging station according to the present invention. In 4*a* a hexagonal second electrode 16 is arranged around a central first electrode 15. The hexagonal second electrode may be simple or, for example, but not by way of limitation, be arranged with magnets in all corners as indicated by circles 24. The second electrode may also be completely of a magnetic or magnetizable material.

FIG. 4*b* shows a charging seat with a central first electrode 15 surrounded by two crescent shaped elements 25 together forming the second electrode.

Figure 5A:
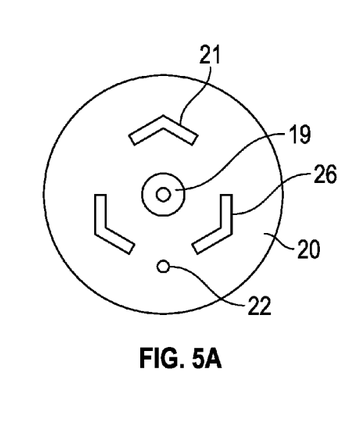
FIGS. 5a and 5b shows exemplary configurations of the third and fourth electrode of the rechargeable unit along with the socket for receiving a second charging means.
Figure 5B:
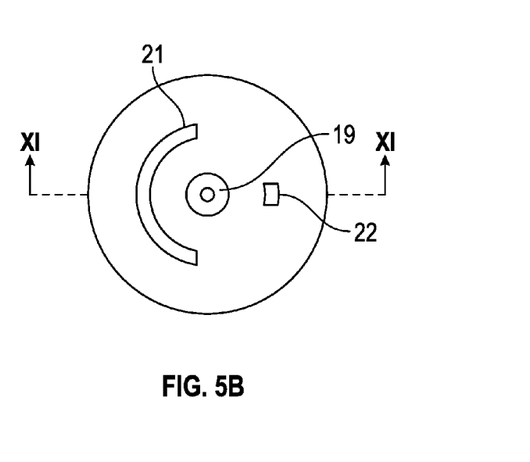

FIGS. 5*a* and 5*b* shows two different exemplary configurations of the third and fourth electrode of a rechargeable unit as known from FIGS. 1 and 3 and according to the present invention.

In FIG. 5*a* a surface 20 of a rechargeable unit 3 is seen. The third electrode 19 is a central conical notch and the fourth electrode 21 consists of three chevrons 26 arranged encircling the third electrode 19. A socket 22 for receiving a simple jack plug is also comprised in the surface 20.

In the surface 20 of FIG. 5*b* a crescent shaped fourth electrode 21 is arranged around a third electrode 19 as known from the previous figures. The surface 20 also comprises a mini USB port 22 for receiving a mini USB plug acting as the second charging means.

Figure 6:
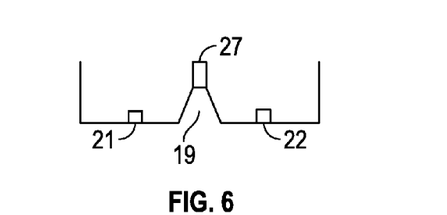
FIG. 6 shows a simplified cross section of the rechargeable unit of FIG. 5b taken along the 6-6 direction.

FIG. 6 is a simplified cross section along the direction XI-XI in FIG. 5*b* to visualize the conical shape of the third electrode 19. The actual conducting element 27 of the third electrode may be present in the apex of the cone.

In the above examples one or more of the electrodes, and preferably the second and fourth electrode, may be magnetic and/or magnetizable.

Thus, according to the present invention is provided a dual charging system with a number of advantages over prior art making it useful in a variety of situations from office use to active situations such as, but not limited to, in moving vehicles. The rechargeable unit according to the present invention may be charged by use of the charging station according to the present invention or by a simple charger with a wire and plug. The charging station provides safe storage and reliable charging of the rechargeable unit, as it is arranged to allow easy insertion and removal of the rechargeable unit and to keep it in a desired position. The rechargeable unit is arranged to be easily inserted in and removed from the charging station and especially the electrodes are arranged to ensure correct alignment with the electrodes of a charging station according to the present invention. The option of charging by plug, and not by the charging station, makes the dual charging system and rechargeable unit on its own useful even under circumstances where the charging station may be unhandy.

Charging System with Charging Cap and Rechargeable Unit

Figure 7:
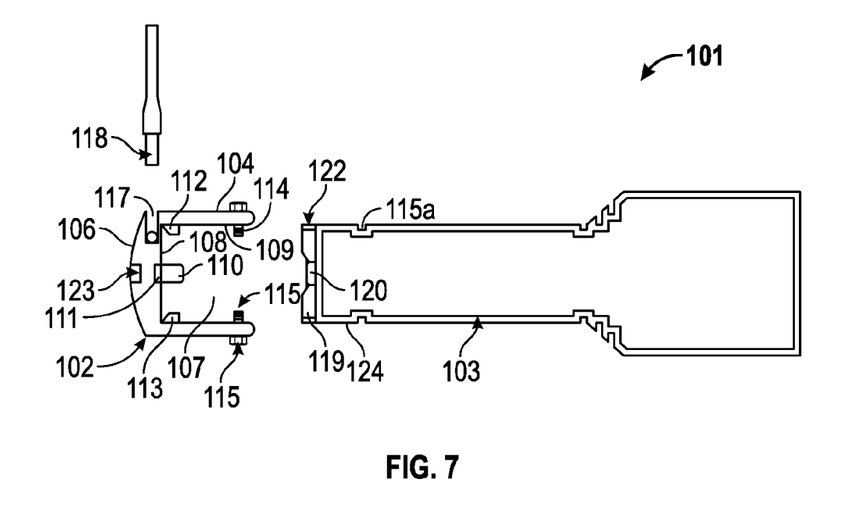
FIG. 7 shows a cross section of a charging cap and a rechargeable unit according to the present invention.
Figure 9:
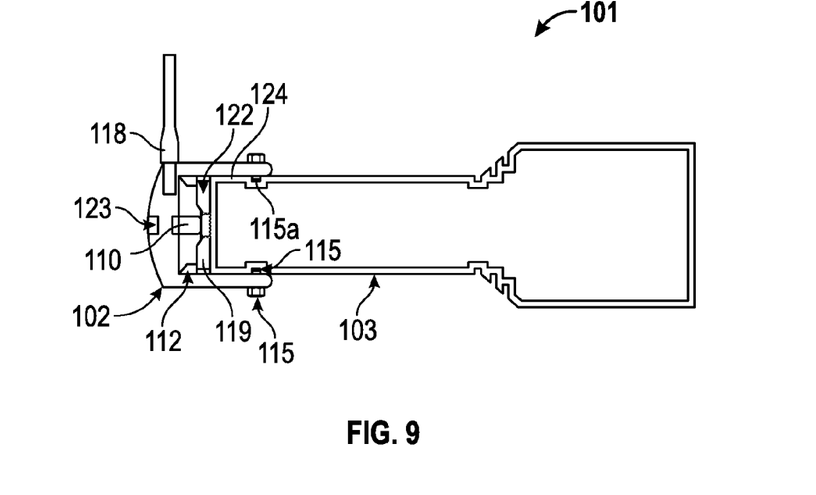
FIG. 9 shows a cross section of a rechargeable unit retained in a charging cap according to the present invention.

FIG. 7 shows a charging system 101 according to the present invention. The charging system 101 comprises a charging cap 102 and a rechargeable unit 103 in the present example in shape of a rechargeable flashlight. The charging cap 102 has a substantially cylindrical wall 104 closed at a first part 105 by a base 106 said wall 104 and base 106 together form a cradle 107 for receiving the rechargeable unit 103. The cradle 107 has a bottom surface 108 and an inner wall 109. A peg 110 extends perpendicularly from the center of the bottom surface 108. The peg 110 is a first electrode of the charging cap 102 and is arranged with a first spring element 111 for spring loading the peg 110 against the rechargeable unit as seen in FIG. 9. The inner wall 109 has a ledge 112 which extends from the first part 105. The ledge 112 is the second electrode of the charging cap 102 and is arranged with a second spring element 113 so that the ledge 112 is spring loaded against the rechargeable unit 103 when inserted into the charging cap 102. At the inner wall 109 at an edge part 114 of the wall 104 two clamping members 115 are attached. The clamping members 115 are in the present example arranged to extend from an outer surface 116 of the wall 104 through the wall 104 and extend far enough off the inner side 109 in order to be able to engage in corresponding recesses 115*a* on the rechargeable unit 103 when the rechargeable unit 103 is inserted into the charging cap 102. The charging cap 102 is further provided with a female socket 117 to receive a cable for connecting with, for example, but not by way of limitation, an AC/DC adapter 118.

The rechargeable unit 103 comprises an end surface 119 having a centered on/off button which is arranged to function as a third electrode 120. The end surface is encircled by a fourth electrode 122. In the present and preferred example the fourth electrode 122 raises above the end surface 119, but embodiments wherein the fourth electrode is in level with the end surface 119 can also be imagined within the framework of the present invention.

Figure 8:
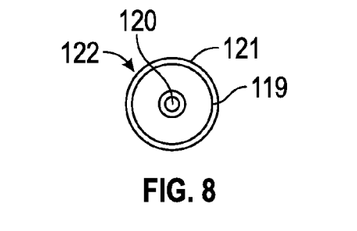
FIG. 8 shows a rechargeable unit from an end surface thereof.

FIG. 8 shows the end surface 119 of the rechargeable unit known from FIG. 7. In the present example the end surface 119 is substantially circular with the third electrode 120 centrally placed in the present example as an on/off button 120 for the rechargeable unit. At the perimeter 121 of the end surface a collar 122 is arranged, said collar 122 is arranged to be the fourth electrode.

FIG. 9 shows charging system 101 as know from FIG. 7 and FIG. 8 here with the rechargeable unit 103 retained in the charging cap 102. The rechargeable unit 103 is pushed in to the charging cap 102 and contact is made between the first electrode 110 and the third electrode 120 and between the second electrode 112 and the fourth electrode 122. The clamping members 115 are engaged and locked in the recess 115a, ensuring that the charging cap 102 stays in its intended position and that the contact between the electrodes of the charging cap and rechargeable units is maintained. The charging cap 102 is locked in this position until the clamping members 115 are released allowing the rechargeable unit/flashlight 103 to be removed from the charging cap 102.

The charging cap 102 also has a charging indicator 123 which may be, for example, but not by way of limitation, a diode. Also, a plug 118 is inserted into the charging cap 102 to provide power.

When engaged in the charging cap 2 the first charging end 24 of the rechargeable unit 3 is covered by the charging cap 2. The rechargeable unit/flashlight 3 of the present example is mainly cylindrical.

As seen from FIG. 7 and FIG. 9, the charging cap 102 fits narrowly around the rechargeable unit 103 and even engaged in the charging cap the rechargeable unit is handy.

The internal parts of the charging cap and rechargeable unit are not shown. However, they may comprise a rechargeable energy source such as a battery, wiring, circuitry, light source, lens, etc.

Rechargeable Unit with Electrodes and Direct Charging Plugs

Figure 10:
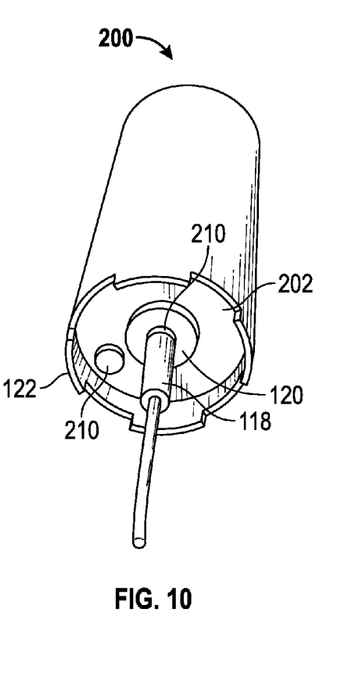
FIG. 10 is a perspective view of a rechargeable unit according to the principle of the invention including an end formed with charging electrodes and two direct charging sockets, and a charging plug inserted into one of the two charging sockets for direct charging of the rechargeable unit.

FIG. 10 is a perspective view of a rechargeable unit 200 that, in the present example, is a rechargeable battery or battery pack, such as a rechargeable lithium-ion battery or battery pack. In an alternate embodiment, rechargeable unit 200 is in the shape of a rechargeable flashlight, such as rechargeable unit 103 discussed above.

Rechargeable unit 200 has an end or end surface 202 having centered on/off button which is arranged to function as third electrode 120 according to charging system 101. The end surface 202 is encircled by fourth electrode 122 according to charging system 101. In the present and preferred example the fourth electrode 122 raises above the end surface 202 and is exemplary of a bezel as in charging system 101, but embodiments wherein the fourth electrode is level with the end surface 202 can also be imagined within the framework of the present invention. As end surface 202 is formed with third electrode 120 and fourth electrode 122, rechargeable unit 200 may be retained in the charging cap 102 according to charging system 101 as shown in FIG. 9 for charging of rechargeable unit 200. Rechargeable unit 200 is pushed in to charging cap 102 and contact is made between the first electrode 110 and the third electrode 120 of rechargeable unit 200 and between the second electrode 112 and the fourth electrode 122 of rechargeable unit 200 to provide charging of rechargeable unit 200 with charging cap 102 according to charging system 101.

Figure 11:
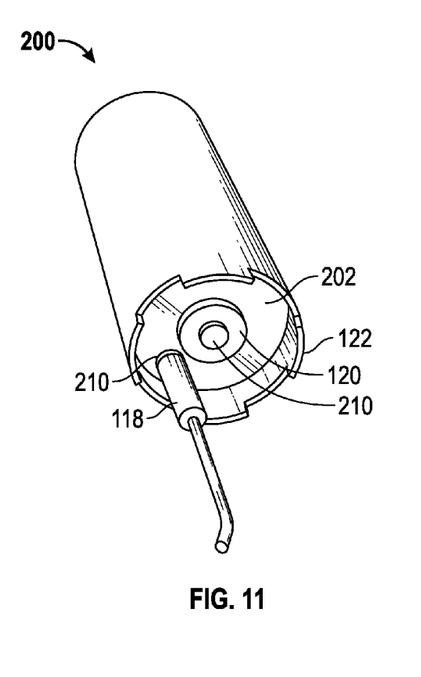
FIG. 11 is a perspective view of the rechargeable unit of FIG. 10 according to the principle of the invention showing a charging plug inserted into the other of the two charging sockets for direct charging of the rechargeable unit.

End surface 202 has two direct charging sockets, including one charging socket 210 formed in third electrode 120 and a second charging socket 210 formed in end surface 202, and which is positioned between third electrode 120 and fourth electrode 122. Charging sockets 210 are female sockets that are each capable of receiving plug 118 according to charging system 101 for direct charging of rechargeable unit 200. FIG. 10 illustrates plug 118 inserted into charging socket 210 formed in third electrode 120 for direct charging of rechargeable unit 200, and FIG. 11 illustrates plug 118 inserted into charging socket 210 positioned between third electrode 120 and fourth electrode 122 for direct charging of rechargeable unit 200. According to the embodiment of FIGS. 10 and 11, the third electrode 120 and the fourth electrode 122 of charging system 101 are combined with direct charging sockets or plugs 210 forming an exemplary charging arrangement. In this combination as set forth and described in conjunction with FIGS. 10 and 11, it offers a consumer the freedom and flexibility to charge a rechargeable unit, such as a battery, battery pack, flashlight, or other rechargeable unit, either using charging cap 102 of charging system 101, charging station 2 of charging system 1, a battery charger, or direct charging at charging sockets or plugs 210, such as through a mains or car adapter.

Figure 12:
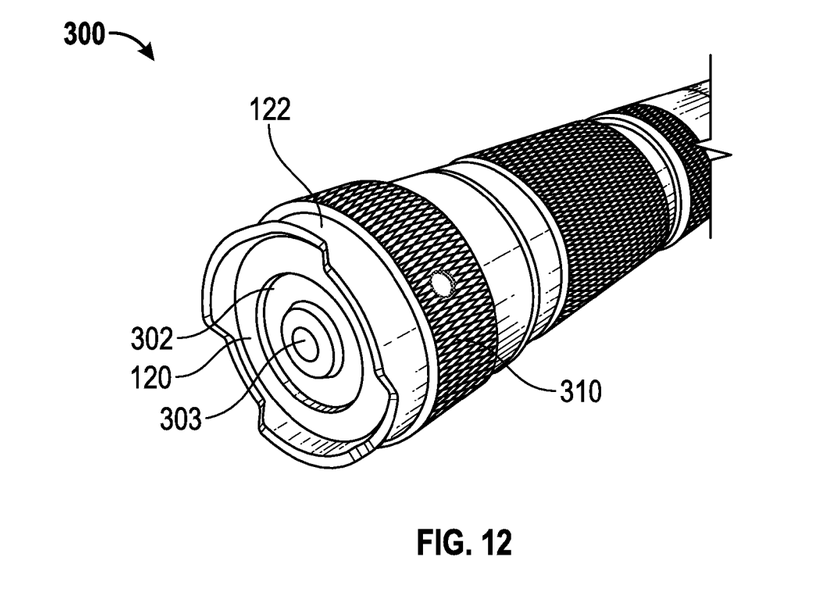
FIG. 12 is a perspective view of another embodiment of a rechargeable unit according to the principle of the invention including an end formed with charging electrodes and a direct charging socket formed in the side of the rechargeable unit near the end.

FIG. 12 is a perspective view of a rechargeable unit 300 that, in the present example, is a rechargeable battery or battery pack, such as a rechargeable lithium-ion battery or battery pack. In an alternate embodiment, rechargeable unit 300 is in the shape of a rechargeable flashlight, such as rechargeable unit 103 discussed above.

Rechargeable unit 300 has an end or end surface 302 having a ring that encircles a centered on/off button 303. The ring is arranged to function as third electrode 120 according to charging system 101, and on/off button 303 is arranged not to function as an electrode. The end surface 302 is encircled by fourth electrode 122 according to charging system 101. In the present and preferred example the fourth electrode 122 raises above the end surface 302 and is exemplary of a bezel as in charging system 101, but embodiments wherein the fourth electrode is level with the end surface 302 can also be imagined within the framework of the present invention. As end surface 302 is formed with third electrode 120 and fourth electrode 122, rechargeable unit 300 may be retained in the charging cap 102 according to charging system 101 as shown in FIG. 9 for charging of rechargeable unit 200. In an additional embodiment, the first electrode 110 is a female electrode socket with a larger diameter than the diameter of the third electrode 120 and slidably receives the third electrode 120 for electrical contact therewith. In a further embodiment, the first electrode 110 is positioned off center and has a small diameter so that it contacts the third electrode 120 off center. In such embodiments, rechargeable unit 300 is pushed in to charging cap 102 and contact is made between the first electrode 110 and the third electrode 120 of rechargeable unit 300 and between the second electrode 112 and the fourth electrode 122 of rechargeable unit 300 to provide charging of rechargeable unit 300 with charging cap 102 according to charging system 101.

Into the side of rechargeable unit 300 near end surface 302, which forms part of a tailcap of rechargeable unit 300, there is a charging plug or socket 310. Charging socket 310 is a female socket that is capable of receiving a plug, such as plug 118 according to charging system 101, for direct charging of rechargeable unit 300. According to the embodiment of FIG. 12, the third electrode 120 of charging system 101 is provided in the form of a ring encircling on/off button 303 and the fourth electrode 122 of charging system 101 are all combined with direct charging socket or plug 310 forming an exemplary charging arrangement. In this combination as set forth and described in conjunction with FIG. 12, it offers a consumer the freedom and flexibility to charge a rechargeable unit, such as a battery, battery pack, flashlight, or other rechargeable unit, either using charging cap 102 of charging system 101, charging station 2 of charging system 1, a battery charger, or direct charging at charging socket or plug 310, such as through a mains or car adapter.

Figure 13:
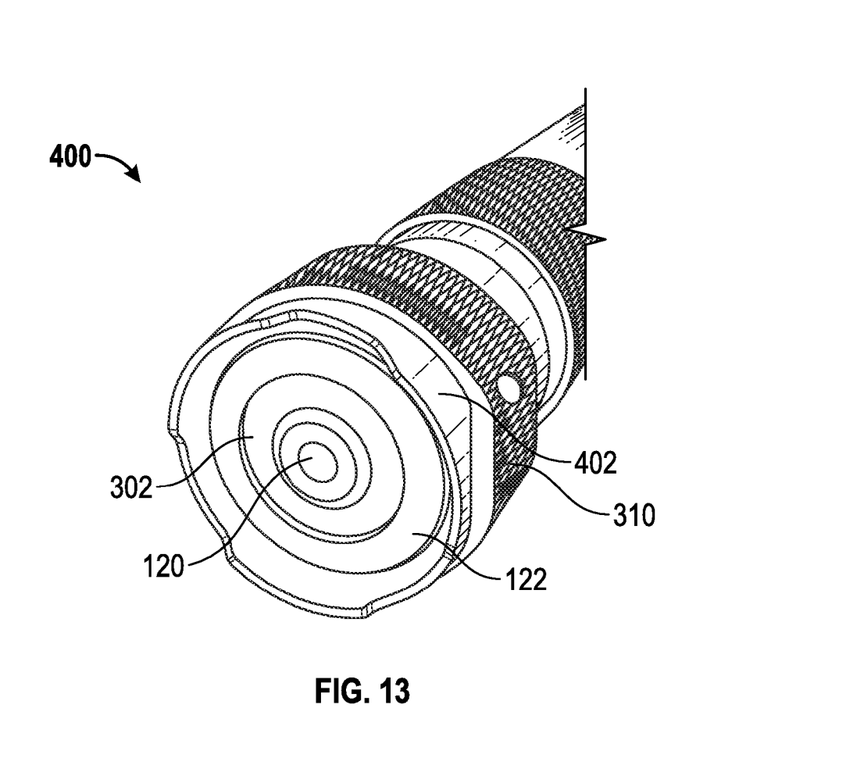
FIG. 13 is a perspective view of yet another embodiment of a rechargeable unit according to the principle of the invention including an end formed with charging electrodes and a direct charging socket formed in the side of the rechargeable unit near the end.

FIG. 13 is a perspective view of a rechargeable unit 400 that, in the present example, is a rechargeable battery or battery pack, such as a rechargeable lithium-ion battery or battery pack. In an alternate embodiment, rechargeable unit 300 is in the shape of a rechargeable flashlight, such as rechargeable unit 103 discussed above.

Rechargeable unit 400 has end or end surface 302 having a ring that encircles a centered on/off button. The on/off button is arranged to function as third electrode 120 according to charging system 101, and the ring encircling the on/off button is arranged to function as fourth electrode 122 according to charging system 101. The end surface 302 is encircled by bezel 402, which raises above the end surface 302 and is arranged not to function as an electrode. Bezel 402 can be made to be level with the end surface 302 if so desired. As end surface 302 is formed with third electrode 120 and fourth electrode 122, rechargeable unit 400 may be retained in the charging cap 102 according to charging system 101 as shown in FIG. 9 for charging of rechargeable unit 200. Rechargeable unit 400 is pushed in to charging cap 102 and contact is made between the first electrode 110 and the third electrode 120 of rechargeable unit 400 and between the second electrode 112 and the fourth electrode 122 of rechargeable unit 400 to provide charging of rechargeable unit 400 with charging cap 102 according to charging system 101.

Into the side of rechargeable unit 400 near end surface 302, which forms part of a tailcap of rechargeable unit 400, there is charging socket 310. Charging socket 310 is s female socket that is capable of receiving a plug, such as plug 118 according to charging system 101, for direct charging of rechargeable unit 400. According to the embodiment of FIG. 13, the third electrode 120 of charging system 101 is the on/off button that is encircled by the ring being the fourth electrode 122, both of which are combined with bezel 402, which is not an electrode, and direct charging socket or plug 310, forming an exemplary charging arrangement. In this combination as set forth and described in conjunction with FIG. 13, it offers a consumer the freedom and flexibility to charge a rechargeable unit, such as a battery, battery pack, flashlight, or other rechargeable unit, either using charging cap 102 of charging system 101, charging station 2 of charging system 1, a battery charger, or direct charging at charging socket or plug 310, such as through a mains or car adapter.

The invention has been described above with reference to preferred embodiments. However, those skilled in the art will recognize that changes and modifications may be made to the embodiments without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof including the ensuing claims, which are considered part of this disclosure, as is the ensuing abstract.

The invention claimed is:

1. A charging system, comprising:
    a charging cap including a base and a circumferential wall which together forms a cradle, the cradle configured for receiving a rechargeable unit for charging in a plurality of orientations, the cradle including a bottom surface and an inner wall having a lower wall part abutting the perimeter of the bottom surface, a peg acting as a first electrode extends from the bottom surface and at least one protrusion acting as a second electrode protrudes from the lower part on the inner wall, said inner wall also comprises one or more clamping members; and,
    a rechargeable unit including a first charging end and an opposing second end, said first charging end having an end surface in which a third electrode is arranged, the first charging end further including a fourth electrode in form of a collar arranged around the end surface, the rechargeable unit further including at least one recess arranged to receive the one or more clamping members of the charging cap for releasably securing the rechargeable unit to the charging cap, the third and fourth electrode of the rechargeable unit arranged for engagement by the first and second electrode of the charging cap when the rechargeable unit is received in the charging cap in a plurality of orientations, to provide electrical contact to enable charging of the rechargeable unit.

2. The charging system according to claim 1, wherein the third electrode is a button for turning on and off the rechargeable unit.

3. The charging system according to claim 1, wherein the first electrode is spring loaded against the third electrode when the rechargeable unit is received in the charging cap.

4. The charging system according to claim 1, wherein the second electrode is spring loaded against the fourth electrode when the rechargeable unit is received in the charging cap.

5. The charging system according to claim 1, wherein at least one of the cradle and the charging end is rotational symmetric.

6. The charging system according to claim 1, wherein the collar is a striking bezel.

7. The charging system according to claim 1, wherein the circumferential wall of the charging cap includes an outer side, an inner side, and at least one opening, and the one or more clamping members extend from the outer side of the wall through the at least one opening in the wall and away from the inner side of the wall.

8. The charging system according to claim 1, wherein the rechargeable unit is a flashlight, and the flashlight is secured to the charging cap by the one or more clamping members.

9. A rechargeable unit for use with a charging cap including one or more clamping members for releasably securing the charging cap to the rechargeable unit, comprising:
    a charging end and an opposing end, said charging end having an end surface in which an end surface electrode is arranged and a collar arranged around the end surface forming a collar electrode, the rechargeable unit including at least one recess arranged to receive the one or more clamping members of the charging cap for releasably securing the charging cap to the rechargeable unit for charging in a plurality of orientations.

10. The rechargeable unit according to claim 9, wherein the end surface include a charging socket configured to receive a charging plug for direct charging of the rechargeable unit.

11. The rechargeable unit according to claim 9, wherein the end surface include a pair of charging sockets, each configured to receive a charging plug for direct charging of the rechargeable unit.

12. The rechargeable unit according to claim 9, wherein the rechargeable unit includes a side with a charging socket configured to receive a charging plug for direct charging of the rechargeable unit.

13. The rechargeable unit according to claim 9, wherein the collar is a striking bezel.

14. The rechargeable unit according to claim 9, wherein the end surface electrode is a button for turning on and off the rechargeable unit.

15. The rechargeable unit according to claim 9, wherein the rechargeable unit is a flashlight, and the flashlight is secured to the charging cap by the one or more clamping members.

16. A charging cap, for use with a rechargeable unit, comprising:
   a base and a circumferential wall which together forms a cradle for receiving the rechargeable unit, the cradle including a bottom surface and an inner wall having a lower wall part abutting the perimeter of the bottom surface, from said bottom surface a peg acting as a first electrode extends and a ledge acting as a second electrode protrudes from the lower wall part of the inner wall, said wall also including one or more clamping members for releasably securing the charging cap to the rechargeable unit for charging in a plurality of orientations.

17. The charging cap according to claim 16, wherein the circumferential wall of the charging cap includes an outer side, an inner side, and at least one opening, and the one or more clamping members extend from the outer side of the wall through the at least one opening in the wall and away from the inner side of the wall.

18. The charging cap according to claim 16, wherein the rechargeable unit is a flashlight, and the flashlight is secured to the charging cap by the one or more clamping members.

* * * * *